(12) United States Patent
Cheng et al.

(10) Patent No.: US 11,563,715 B2
(45) Date of Patent: Jan. 24, 2023

(54) PATTERN MATCHING BY A NETWORK DEVICE FOR DOMAIN NAMES WITH WILDCARD CHARACTERS

(71) Applicant: Juniper Networks, Inc., Sunnyvale, CA (US)

(72) Inventors: Fei Cheng, Beijing (CN); Tao Zhao, Beijing (CN)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 17/182,945

(22) Filed: Feb. 23, 2021

(65) Prior Publication Data

US 2022/0166746 A1 May 26, 2022

(30) Foreign Application Priority Data

Nov. 23, 2020 (WO) ................ PCT/CN2020/130841

(51) Int. Cl.
*H04L 29/12* (2006.01)
*G06F 16/22* (2019.01)
*G06F 7/00* (2006.01)
*H04L 61/5046* (2022.01)
*H04L 61/4511* (2022.01)

(52) U.S. Cl.
CPC ...... *H04L 61/5046* (2022.05); *G06F 16/2255* (2019.01); *G06F 16/2264* (2019.01); *H04L 61/4511* (2022.05)

(58) Field of Classification Search
CPC ............ H04L 61/2046; H04L 61/1511; G06F 16/2255; G06F 16/2264
See application file for complete search history.

(56) References Cited

U.S. PATENT DOCUMENTS

| | | | |
|---|---|---|---|
| 8,407,245 B2 | 3/2013 | Ryan et al. | |
| 2012/0130983 A1* | 5/2012 | Ryan ................ | G06F 16/90344 707/715 |
| 2015/0078386 A1* | 3/2015 | Jackson ................ | H04L 69/22 370/392 |
| 2016/0197831 A1 | 7/2016 | De Foy et al. | |

(Continued)

FOREIGN PATENT DOCUMENTS

| | | |
|---|---|---|
| AU | 2010279477 B2 | 2/2011 |
| WO | WO-2020142649 A1 * | 7/2020 ........... G06F 16/137 |

*Primary Examiner* — Christopher B Robinson
(74) *Attorney, Agent, or Firm* — Harrity & Harrity, LLP

(57) ABSTRACT

A network device may receive data, may extract primary patterns from a plurality of domain names included in the data, may process the primary patterns, with a hash model, to generate hash keys for the primary patterns, wherein a hash key includes a hash value associated with a wildcard character, and may store the plurality of domain names in a hash table. The network device may extract a particular primary pattern from a particular domain name included in a search request, may determine potential matching patterns based on the particular primary pattern, and may process the potential matching patterns, with the hash model, to generate potential matching hash keys for the potential matching patterns, wherein a hash key includes a hash value associated with a wildcard character. The network device may search, based on the potential matching hash keys, the hash table to identify a matching domain name.

20 Claims, 13 Drawing Sheets

(56) References Cited

U.S. PATENT DOCUMENTS

Figure 1A:
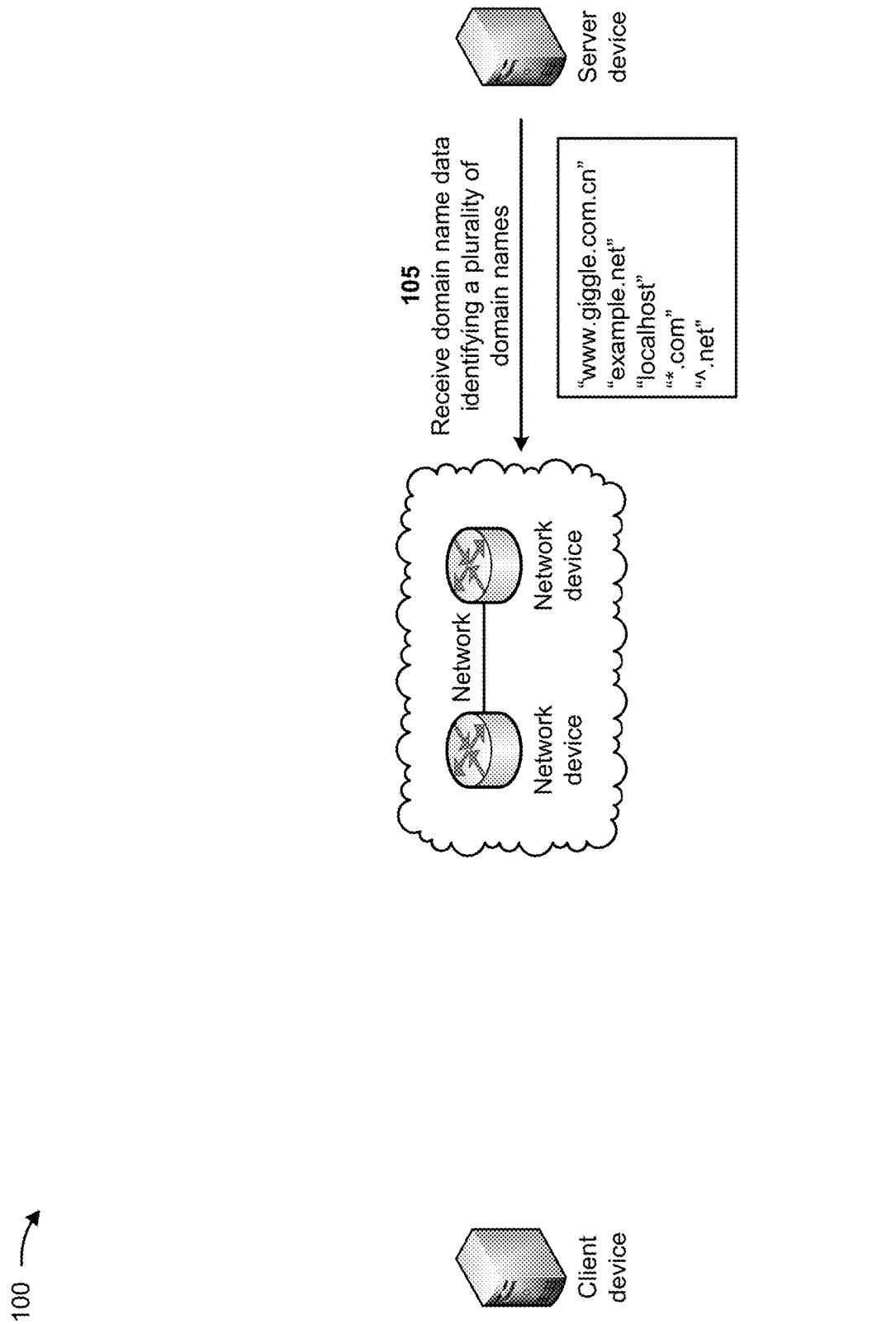

| | | | | |
|---|---|---|---|---|
| 2017/0237706 A1* | 8/2017 | Wei | ................... | H04L 61/4511 |
| | | | | 370/392 |
| 2017/0331789 A1* | 11/2017 | Kumar | ............... | H04L 63/0272 |
| 2018/0295134 A1* | 10/2018 | Gupta | ................... | H04L 67/02 |

* cited by examiner

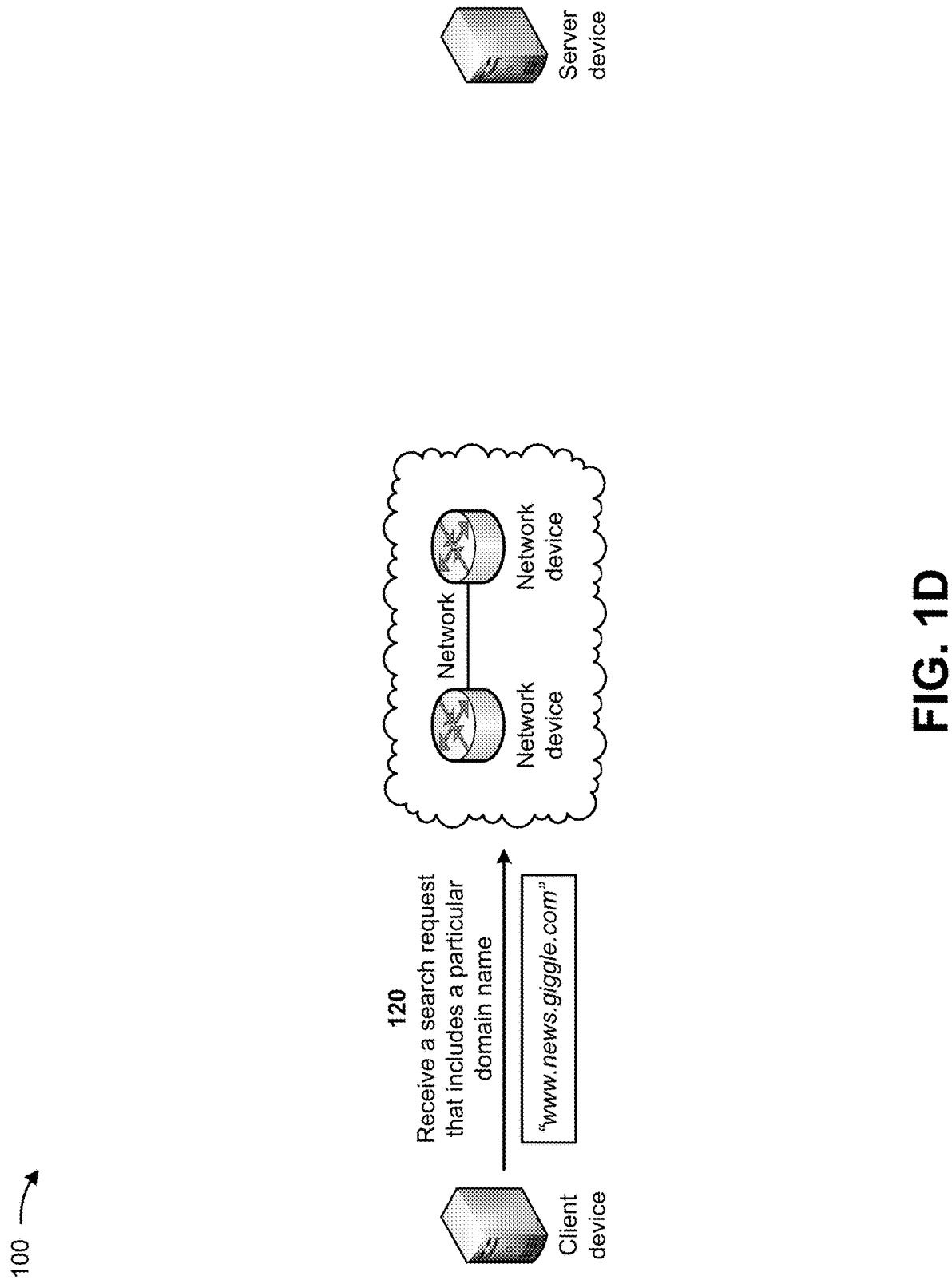

PATTERN MATCHING BY A NETWORK DEVICE FOR DOMAIN NAMES WITH WILDCARD CHARACTERS

CROSS-REFERENCE TO RELATED APPLICATION

This application claims priority to Patent Cooperation Treaty (PCT) Application No. PCT/CN2020/130841, filed on Nov. 23, 2020, and entitled "PATTERN MATCHING BY A NETWORK DEVICE FOR DOMAIN NAMES WITH WILDCARD CHARACTERS," the content of which is incorporated by reference herein in its entirety.

BACKGROUND

A domain name is an identification string that defines a destination of a resource on a network, such as the Internet. Domain names are used in various networking contexts and for application-specific naming and addressing purposes.

SUMMARY

In some implementations, a method includes receiving, by a network device, domain name data identifying a plurality of domain names, wherein one or more of the plurality of domain names include a wildcard character; extracting, by the network device, primary patterns from the plurality of domain names, wherein one or more of the primary patterns include a wildcard character; processing, by the network device, the primary patterns, with a hash model, to generate hash keys for the primary patterns, wherein one or more of the hash keys include a hash value associated with a wildcard character; storing, by the network device and based on the hash keys, the plurality of domain names in a hash table; receiving, by the network device and from another device, a search request that includes a particular domain name; extracting, by the network device, a particular primary pattern from the particular domain name; determining, by the network device, potential matching patterns based on the particular primary pattern, wherein one or more of the potential matching patterns include a wildcard character; processing, by the network device, the potential matching patterns, with the hash model, to generate potential matching hash keys for the potential matching patterns, wherein one or more of the potential matching hash keys include a hash value associated with a wildcard character; searching, by the network device and based on the potential matching hash keys, the hash table to identify a matching domain name; and sending, by the network device, a message that identifies the matching domain name to the other device.

In some implementations, a network device includes one or more memories and one or more processors to: receive domain name data identifying a plurality of domain names; identify second words located from a right direction in the plurality of domain names; identify third words located from the right direction in the plurality of domain names; combine the second words and the third words to generate primary patterns from the plurality of domain names; process the primary patterns, with a hash model, to generate hash keys for the primary patterns, wherein one or more of the hash keys include a hash value associated with a wildcard character; store, based on the hash keys, the plurality of domain names in a hash table; receive a search request that includes a particular domain name; extract a particular primary pattern from the particular domain name; determine potential matching patterns based on the particular primary pattern; process the potential matching patterns, with the hash model, to generate potential matching hash keys for the potential matching patterns, wherein one or more of the potential matching hash keys include a hash value associated with a wildcard character; search, based on the potential matching hash keys, the hash table to identify a matching domain name; and send a message that identifies the matching domain name to another device.

In some implementations, a non-transitory computer-readable medium storing a set of instructions includes one or more instructions that, when executed by one or more processors of a network device, cause the network device to: receive domain name data identifying a plurality of domain names; extract primary patterns from the plurality of domain names; process the primary patterns, with a hash model, to generate hash keys for the primary patterns, wherein one or more of the hash keys include a hash value associated with a wildcard character; store, based on the hash keys, the plurality of domain names in a hash table; receive, from a client device, a search request that includes a particular domain name; extract a particular primary pattern from the particular domain name; determine potential matching patterns based on the particular primary pattern; process the potential matching patterns, with the hash model, to generate potential matching hash keys for the potential matching patterns, wherein one or more of the hash keys include a hash value associated with a wildcard character; search, based on the potential matching hash keys, the hash table to identify a matching domain name; and send a message that includes information associated with the matching domain name to another device.

BRIEF DESCRIPTION OF THE DRAWINGS

FIGS. 1A-1G are diagrams of an example implementation described herein.

FIG. 2 is a diagram of an example environment in which systems and/or methods described herein may be implemented.

FIGS. 3-4 are diagrams of example components of one or more devices of FIG. 2.

FIGS. 5-7 are flowcharts of example processes relating to pattern matching for domain names with wildcard characters.

DETAILED DESCRIPTION

The following detailed description of example implementations refers to the accompanying drawings. The same reference numbers in different drawings may identify the same or similar elements.

A network device, such as a firewall device or other security device, of a network may be used to allow or block network traffic associated with the network. Typically, the network device may receive a request from a client device for access to a domain name. The network device may use conventional tree-based search techniques and/or regular expression-based search techniques in a data structure to find information associated with the domain name in order to determine whether to allow or block traffic associated with the domain name. However, these searching techniques are complex and require the network device to store state information associated with domain names. Accordingly, these searching techniques require a high utilization of computing resources (e.g., processing resources, memory resources, communication resources, and/or power resources, among other examples) of the network device.

Moreover, when wildcards are used as part of pattern matching for a domain name, an even higher utilization of computing resources is needed. This limits the ability of the network device to provide massive domain name matching.

Some implementations described herein provide a network device that provides pattern matching for domain names with wildcard characters. In some implementations, the network device may receive domain name data identifying a plurality of domain names and may extract primary patterns from the plurality of domain names. The network device may process the primary patterns, with a hash model, to generate hash keys for the primary patterns. The hash model may assign specific values for words of the primary patterns (e.g., where the words include wildcards and/or non-standard words). The network device may store the plurality of domain names in a hash table based on the hash keys. The network device may receive a search request from a client device and may extract a particular primary pattern from a particular domain name included in the search request. The network device may determine potential matching patterns based on the particular primary pattern and may process the potential matching patterns, with the hash model, to generate potential matching hash keys for the potential matching patterns. The network device may search, based on the potential matching hash keys, the hash table to identify a matching domain name and may send a message including information associated with the matching domain name to the client device.

In this way, the network device supports searches using domain name pattern matching, where domain names include wildcards. Because the network device utilizes a hashing-based search technique to search for a matching domain name, the network device utilizes less computing resources (e.g., processing resources, memory resources, communication resources, and/or power resources, among other examples) than would otherwise be utilized when using a tree-based search technique and/or a regular expression-based search technique. Moreover, the network device may adjust a size of the hash table (e.g., based on a quantity of the domain name data) to reduce an amount of computing resources (e.g., processing resources, memory resources, communication resources, and/or power resources, among other examples) to provision and/or search the hash table and/or to decrease an amount of time to search the hash table to identify a matching domain name. Accordingly, the network device may provide an improved performance of the network device when using a hash table as opposed to not using a hash table.

FIGS. 1A-1G are diagrams of an example implementation 100 associated with pattern matching for domain names with wildcard characters. As shown in FIGS. 1A-1G, example implementation 100 includes a client device, a plurality of network devices, and a server device. These devices are described in more detail below in connection with FIGS. 2-4. The plurality of network devices may be associated with a network that connects the client device and the server device, as described herein.

Turning to FIG. 1A, and reference number 105, a network device, of the plurality of network devices, may receive domain name data from the server device. The domain name data may identify one or more domain names. For example, as shown in FIG. 1A, the server device may send, to the network device, domain name data that identifies the domain names "www.giggle.com.cn," "example.net," "localhost," "*.com," and "^.net." In some implementations, a domain name may include a wildcard, such as an asterisk (*) or a caret (^). The asterisk may represent zero or more words in the domain name. For example, for the domain name "*.com," the asterisk may represent zero or more words to the left of ".com." The caret may represent one word in the domain name. For example, for the domain name "^.net," the caret may represent one word to the left of ".net." While some implementations described herein are directed to the asterisk and caret wildcards, other types of wildcards are contemplated, such as wildcards that represent zero or more characters, a single character, zero or more digits, and/or a single digit, among other examples.

One or more words of a domain name may be arranged in an order (e.g., from a right direction, also referred to as a right-to-left direction). The one or more or more words may be separated by periods (.). For example, the domain name "www.giggle.com.cn" is arranged in an order, from the right direction, where "cn" is the first word in the order, "com" is the second word in the order, "giggle" is the third word in the order, and "www" is the fourth word in the order. As another example, the domain name "example.net" is arranged in an order, from the right direction, where "net" is the first word in the order and "example" is the second word in the order. In an additional example, the domain name "*.com" is arranged in an order, from the right direction, where "com" is the first word in the order and "*" is the second word in the order. As a further example, the domain name "^.net" is arranged in an order, from the right direction, where "net" is the first word in the order and "^" is the second word in the order. In another example, the domain name "localhost" is arranged in an order, where "localhost" is the first (and only) word in the order.

Figure 1B:
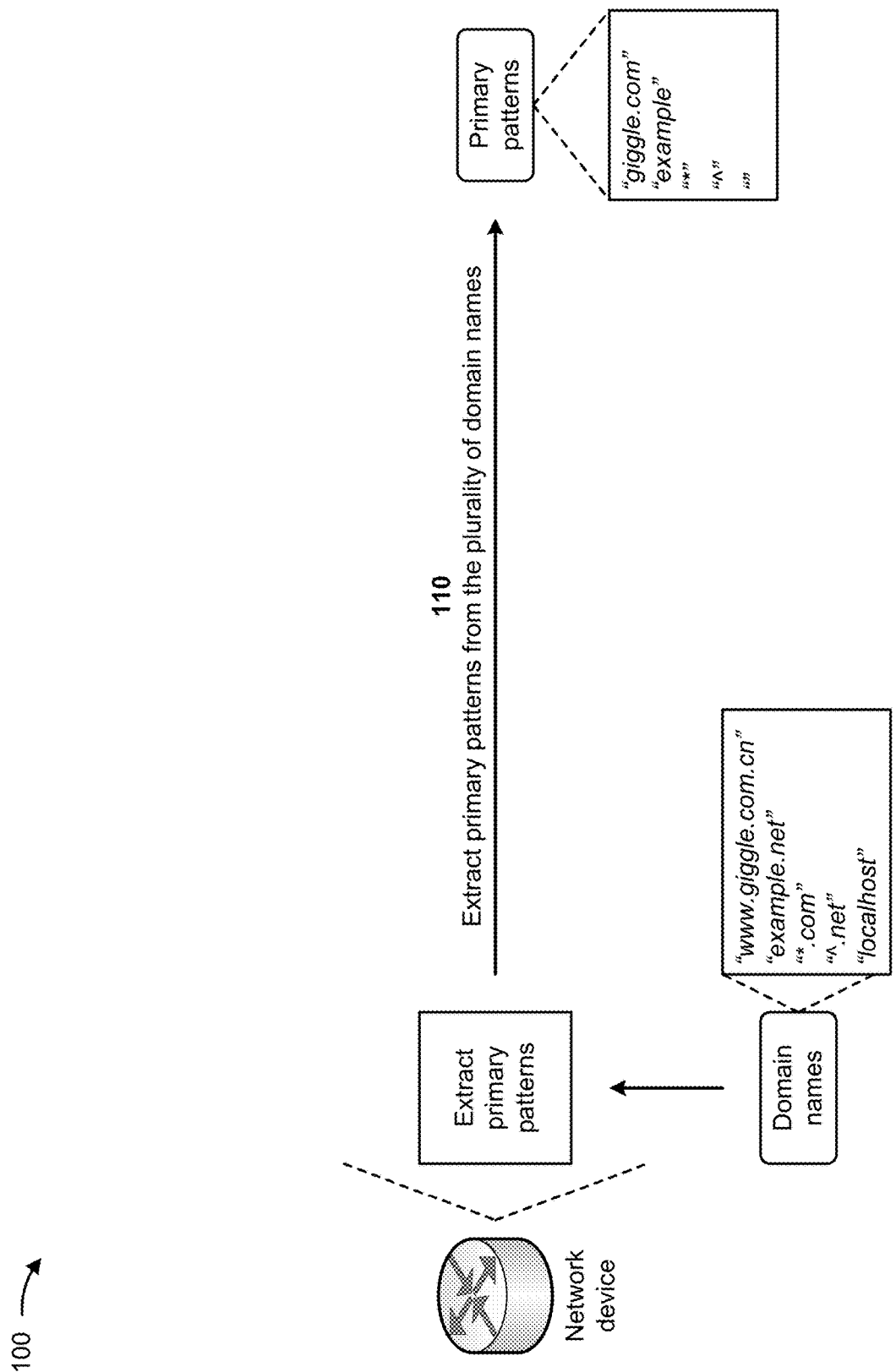

Turning to FIG. 1B, and reference number 110, the network device may extract primary patterns from the plurality of domain names. A primary pattern for a domain name may include a part of the domain name that indicates one or more distinctive words of the domain name. In some implementations, the network device may extract a primary pattern from a domain name by ignoring the first word of the domain name and identifying the rest of the words of the domain name as the primary pattern. For example, for the domain name "www.giggle.com.cn," the network device may ignore the first word "cn" and identify "www.giggle.com" as the primary pattern of the domain name.

In some implementations, the network device may extract a primary pattern from a domain name by identifying a second word and/or a third word of the domain name as the primary pattern of the domain name. When the domain name includes at least three words, the network device may identify the second word and the third word of the domain name and combine the second word and the third word to generate the primary pattern. For example, for the domain name "www.giggle.com.cn," the network device may identify "com" as the second word of the domain name and/or "giggle" as the third word and may combine "com" and "giggle" to generate the primary pattern "giggle.com." When the domain name includes two words, the network device may identify the second word as the primary pattern. For example, for the domain name "example.net," the network device may identify "example" as the second word of the domain name and may identify "example" as the primary pattern. In another example, for the domain name "*.com," the network device may identify "*" as the second word of the domain name and may identify "*" as the primary pattern. In an additional example, for the domain name "^.net," the network device may identify "^" as the second word of the domain name and may identify "^" as the primary pattern.

In some implementations, when the domain name includes one word, the network device may indicate that the domain name does not have a primary pattern. For example, for the domain name "localhost," the network device may identify that the domain name includes only one word and may indicate (an empty identifier) as the primary pattern.

Figure 1C:
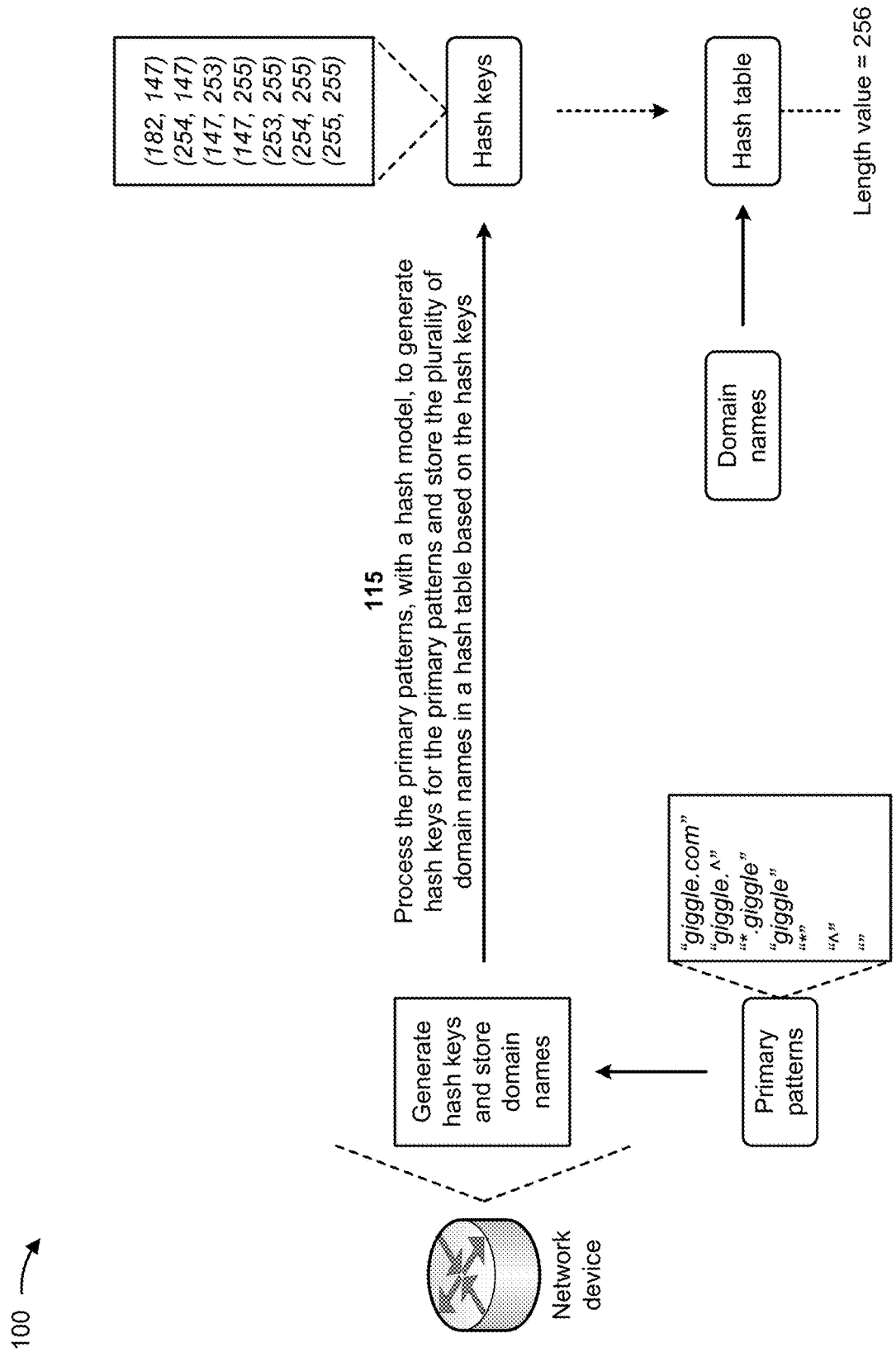

Turning to FIG. 1C, and reference number 115, the network device may process the primary patterns (e.g., that are associated with the plurality of domain names) with a hash model (e.g., that utilizes one or more hashing functions), to generate hash keys for the primary patterns. Accordingly, the network device may store the plurality of domain names in a hash table (e.g., that is maintained by the network device) based on the hash keys.

In some implementations, the network device may process a primary pattern of a domain name, with the hash model, to generate n hash values (where n≥1). For example, the network device may process n words of a primary pattern to generate n hash values, where each word of the primary pattern is associated with a respective hash value that is in a range from zero to one less than a length value m (where m≥1) of a hash table described herein. The hash model may assign specific values for wildcards or non-standard words. For example, when the network device uses the hash model to process an asterisk (*), the network device may generate a hash value of m−3; when the network device uses the hash model to process a caret (ˆ), the network device may generate a hash value of m−2; and/or when the network device uses the hash model to process an empty identifier (" "), the network device may generate a hash value of m−1.

The hash table may be an n-dimensional hash table (e.g., a one-dimensional hash table, a two-dimensional hash table, or a three-dimensional hash table, among other examples). The hash table may be associated with the length value m that indicates a number of entries of the hash table associated with one dimension of the hash table. For example, for a one-dimensional hash table, the hash table may have m entries; for a two-dimensional hash table, the hash table may have m×m entries; for a three-dimensional hash table, the hash table may have m×m×m entries; and so on. Accordingly, the network device may adjust a size of the hash table according to a quantity of the domain name data (e.g., a quantity of the one or more domain names). For example, the network device may adjust the length value m to reduce an amount of space needed to represent the hash table in memory and/or to reduce an amount of collisions that may occur when storing the plurality of domain names in the hash table (as described below).

The network device may combine n hash values (e.g., that were generated by the network device processing a primary pattern of a domain name) to generate a hash key for the primary pattern. The hash key may be, for example, an n-tuple that includes the n hash values. Accordingly, the network device may store a domain name associated with the hash key in an entry of the hash table based on the hash key. For example, when the hash key is a 1-tuple (x), the network device may store the domain name associated with the hash key in an entry associated with an x index of a one-dimensional hash table; when the hash key is a 2-tuple (x, y), the network device may store the domain name associated with the hash key in an entry associated with an (x, y) index of a two-dimensional hash table; or when the hash key is a 3-tuple (x, y, z), the network device may store the domain name associated with the hash key in an entry associated with an (x, y, z) index of a three-dimensional hash table; among other examples. In some implementations, the network device may include additional information associated with the domain name in the entry of the hash table, such as an Internet protocol (IP) address of the domain name and/or one or more rules associated with accessing the IP address, among other examples.

In some implementations, a first hash key associated with a first domain name, of the plurality of domain names, may be the same as a second hash key associated with a second domain name, of the plurality of domain names (e.g., the first hash key and the second hash key are each (x), (x, y), or (x, y, z), among other examples). Accordingly, the network device may store the first domain name and the second domain name in the same entry of the hash table (e.g., that is associated with the first hash key and the second hash key) as nodes of a linked list.

In some implementations, each primary pattern, of the primary patterns identified by the network device (e.g., as described herein in relation to FIG. 1B and reference number 110), includes two words, one word, or no words. For example, as shown in FIG. 1C, the primary patterns may include "giggle.com," "giggle.ˆ," "*.giggle," "giggle," "*," "ˆ," and " ". In this scenario, the network device may process a primary pattern, of the primary patterns, with the hash model, to generate two hash values. For example, as shown in FIG. 1C, the network device may generate the two hash values based on the hash table having a length value of 256, and therefore each hash value is between 0 and 255. The network device may combine the two hash values to form a hash key (e.g., a 2-tuple that includes the two hash values) for the primary pattern.

When the primary pattern includes two words, the network device may process a first word (e.g., from a right direction) in the primary pattern, using the hash model, to generate a first hash value, and may process a second word (e.g., from the right direction) in the primary pattern, using the hash model, to generate a second hash value. For example, for the primary pattern "giggle.com," the network device may generate a first hash value of 182 for "com" and a second hash value of 147 for "giggle." The network device may combine the first hash value and the second hash value to generate a hash key comprising the 2-tuple (182, 147). As another example, for the primary pattern "giggle.ˆ," the network device may generate a first hash value of 254 (e.g., 256 minus 2) for "ˆ" and a second hash value of 147 for "giggle." The network device may combine the first hash value and the second hash value to generate a hash key comprising the 2-tuple (254, 147). In an additional example, for the primary pattern "*.giggle," the network device may generate a first hash value of 147 for "giggle" and a second hash value of 253 (e.g., 256 minus 3) for "*." The network device may combine the first hash value and the second hash value to generate a hash key comprising the 2-tuple (147, 253).

When the primary pattern includes one word, the network device may process the word in the primary pattern, using the hash model, to generate a first hash value, and may assign a default value as a second hash value. For example, for the primary pattern "giggle," the network device may generate a first hash value of 147 for "giggle" and a second hash value of 255 (e.g., that is associated with the empty identifier, 256 minus 1). The network device may combine the first hash value and the second hash value to generate a hash key comprising the 2-tuple (147, 255). As another example, for the primary pattern "*," the network device may generate a first hash value of 253 (e.g., 256 minus 3) for "*" and a second hash value of 255 (e.g., that is associated with the empty identifier, 256 minus 1). The network device may combine the first hash value and the second hash value to generate a hash key comprising the 2-tuple (253, 255). In an additional example, for the primary pattern "^," the network device may generate a first hash value of 254 (e.g., 256 minus 2) for "^" and a second hash value of 255 (e.g., that is associated with the empty identifier, 256 minus 1). The network device may combine the first hash value and the second hash value to generate a hash key comprising the 2-tuple (254, 255).

When the primary pattern does not include any words (e.g., the primary pattern includes an empty identifier, such as " "), the network device may assign a first default value as a first hash value and a second default value as a second hash value. For example, for the primary pattern " ", the network device may generate a first hash value of 255 (e.g., that is associated with the empty identifier, 256 minus 1) and a second hash value of 255. The network device may combine the first hash value and the second hash value to generate a hash key comprising the 2-tuple (255, 255).

The network device may store the respective domain names associated with the primary patterns based on the hash keys. For example, the network device may store a domain name associated with the primary pattern "giggle.com" in an entry associated with a (182, 147) index of the hash table; may store a domain name associated with the primary pattern "giggle.^" in an entry associated with a (254, 147) index of the hash table; may store a domain name associated with the primary pattern "*.giggle" in an entry associated with a (147, 253) index of the hash table; may store a domain name associated with the primary pattern "giggle" in an entry associated with a (147, 255) index of the hash table; may store a domain name associated with the primary pattern "*" in an entry associated with a (253, 255) index of the hash table; may store a domain name associated with the primary pattern "^" in an entry associated with a (254, 255) index of the hash table; and/or may store a domain name associated with the primary pattern in an entry associated with a (255, 255) index of the hash table.

Turning to FIG. 1D, and reference number 120, the network device may receive a search request that includes a particular domain name. A user of the client device may interact with the client device to cause the client device to generate and send the search request to the network. Accordingly, the network device may receive the search request (e.g., directly from the client device or via another network device of the network). For example, as shown in FIG. 1D, the client device may send a search request for "www.news.giggle.com" to the network and the network device may receive the search request.

Figure 1E:
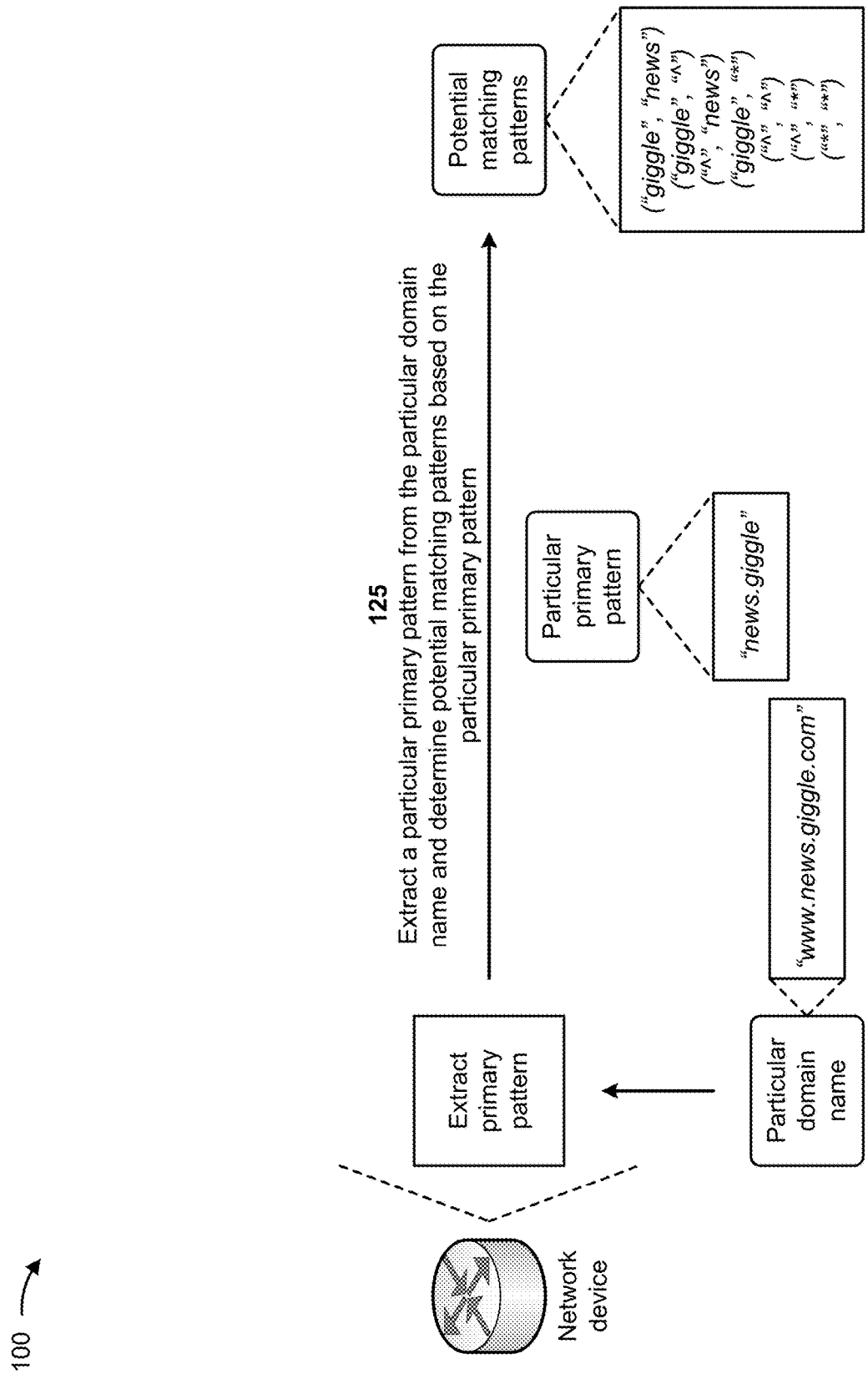

Turning to FIG. 1E, and reference number 125, the network device may extract a particular primary pattern from the particular domain name (e.g., in a similar manner as that described herein in relation to FIG. 1B and reference number 110). In some implementations, the network device may extract the particular primary pattern from the particular domain name by ignoring the first word of the particular domain name and identifying the rest of the words of the particular domain name as the particular primary pattern. For example, for the domain name "www.news.giggle.com," the network device may ignore the first word "com" and identify "www.news.giggle" as the primary pattern of the domain name.

In some implementations, the network device may extract the particular primary pattern from the particular domain name by identifying and/or combining a second word and/or a third word of the particular domain name as the particular primary pattern of the particular domain name (e.g., in a similar manner as that described herein in relation to FIG. 1B and reference number 110). For example, as shown in FIG. 1E, for the particular domain name "www.news.giggle.com," the network device may identify "giggle" as the second word of the particular domain name and "news" as the third word, and may combine "giggle" and "news" to generate the particular primary pattern "news.giggle." In some implementations, when the domain name includes one word, the network device may indicate that the particular domain name does not have a particular primary pattern (e.g., by providing the empty identifier " " as the particular primary pattern).

As further shown by reference number 125, the network device may determine potential matching patterns associated with the particular domain name (e.g., based on the particular primary pattern). A potential matching pattern may be the same as or similar to a domain name that is stored in an entry of the hash table.

In some implementations, the network device may process the particular primary pattern to generate a potential matching pattern that includes a first word and a second word of the particular primary pattern. For example, as shown in FIG. 1E, for the particular primary pattern "news.giggle," the network device may generate a potential matching pattern that includes the first word "giggle" and the second word "news," such as the 2-tuple ("giggle", "news"). In some implementations, the network device may process the particular primary pattern to generate a potential matching pattern that includes the first word or second word of the particular primary pattern and a wildcard, such as a caret or asterisk. For example, as shown in FIG. 1E, for the particular primary pattern "news.giggle," the network device may generate a potential matching pattern that includes the first word "giggle" or the second word "news" and a caret or asterisk, such as the 2-tuples ("giggle", "^"), ("^", "news"), or ("giggle", "*"), among other examples. In some implementations, the network device may process the particular primary pattern to generate a potential matching pattern that includes two wildcards, such as two carets, two asterisks, or a caret and an asterisk. For example, as shown in FIG. 1E, for the particular primary pattern "news.giggle," the network device may generate a potential matching pattern that includes the 2-tuples ("^", "^"), ("^", "*"), or ("*", "*"), among other examples.

Figure 1F:
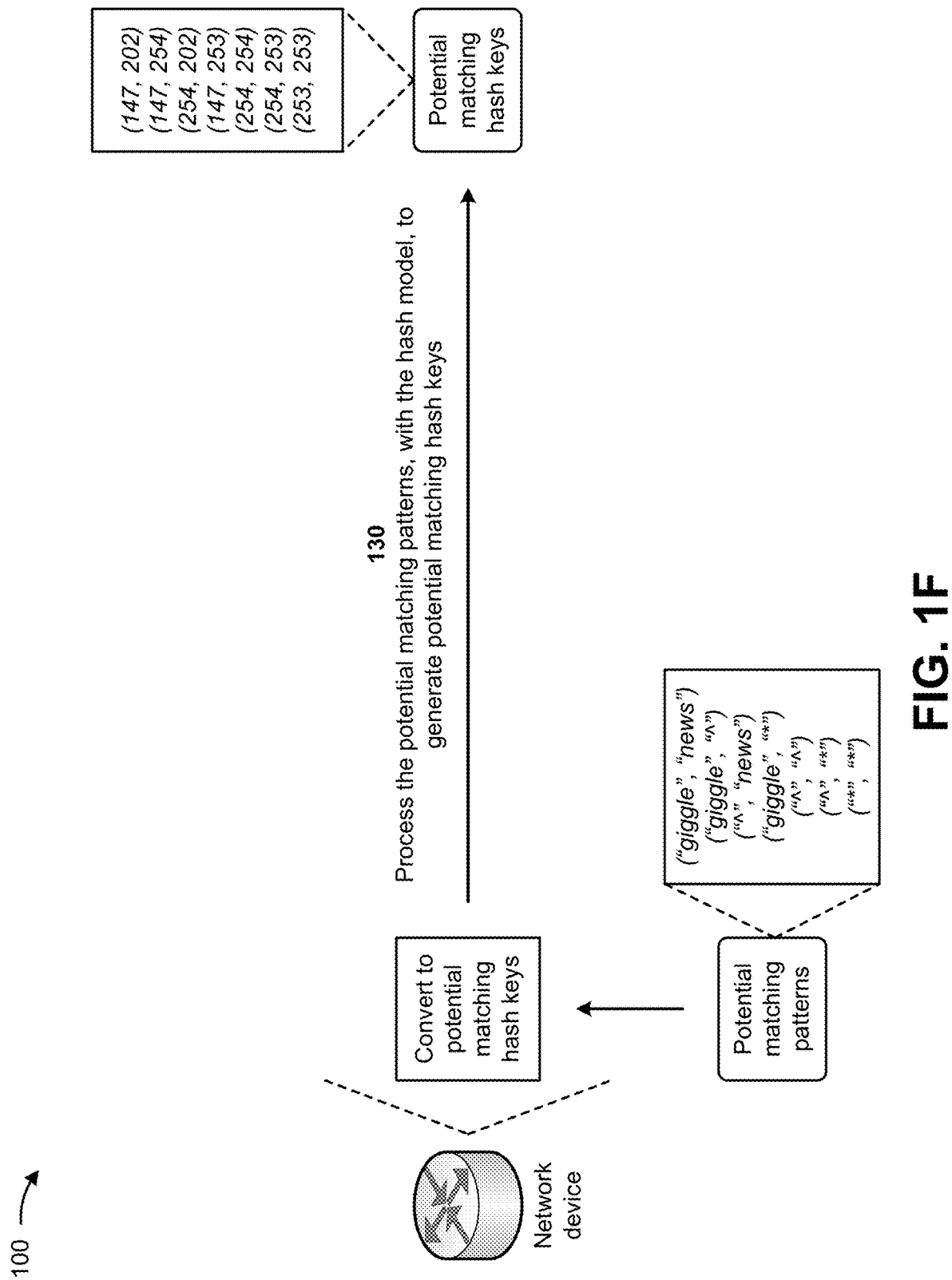

Turning to FIG. 1F, and reference number 130, the network device may process the potential matching patterns, with the hash model, to generate potential matching hash keys for the potential matching patterns (e.g., in a similar manner as that described herein in relation to FIG. 1C and reference number 115).

For example, for the potential matching pattern ("giggle", "news"), the network device may generate a first hash value of 147 for "giggle" and a second hash value of 202 for "news." The network device may combine the first hash value and the second hash value to generate a potential matching hash key comprising the 2-tuple (147, 202). As another example, for the potential matching pattern ("giggle", "^"), the network device may generate a first hash value of 147 for "giggle" and a second hash value of 254 for "^." The network device may combine the first hash value and the second hash value to generate a potential matching hash key comprising the 2-tuple (147, 254). In additional examples, the network device may generate a potential matching hash key comprising the 2-tuple (254, 202) for the potential matching pattern ("^", "news"), a potential matching hash key comprising the 2-tuple (147, 253) for the potential matching pattern ("giggle", "*"), a potential matching hash key comprising the 2-tuple (254, 254) for the potential matching pattern ("^", "^"), a potential matching hash key comprising the 2-tuple (254, 253) for the potential matching pattern ("^", "*"), and/or a potential matching hash key comprising the 2-tuple (253, 253) for the potential matching pattern ("*", "*") in a similar manner.

Figure 1G:
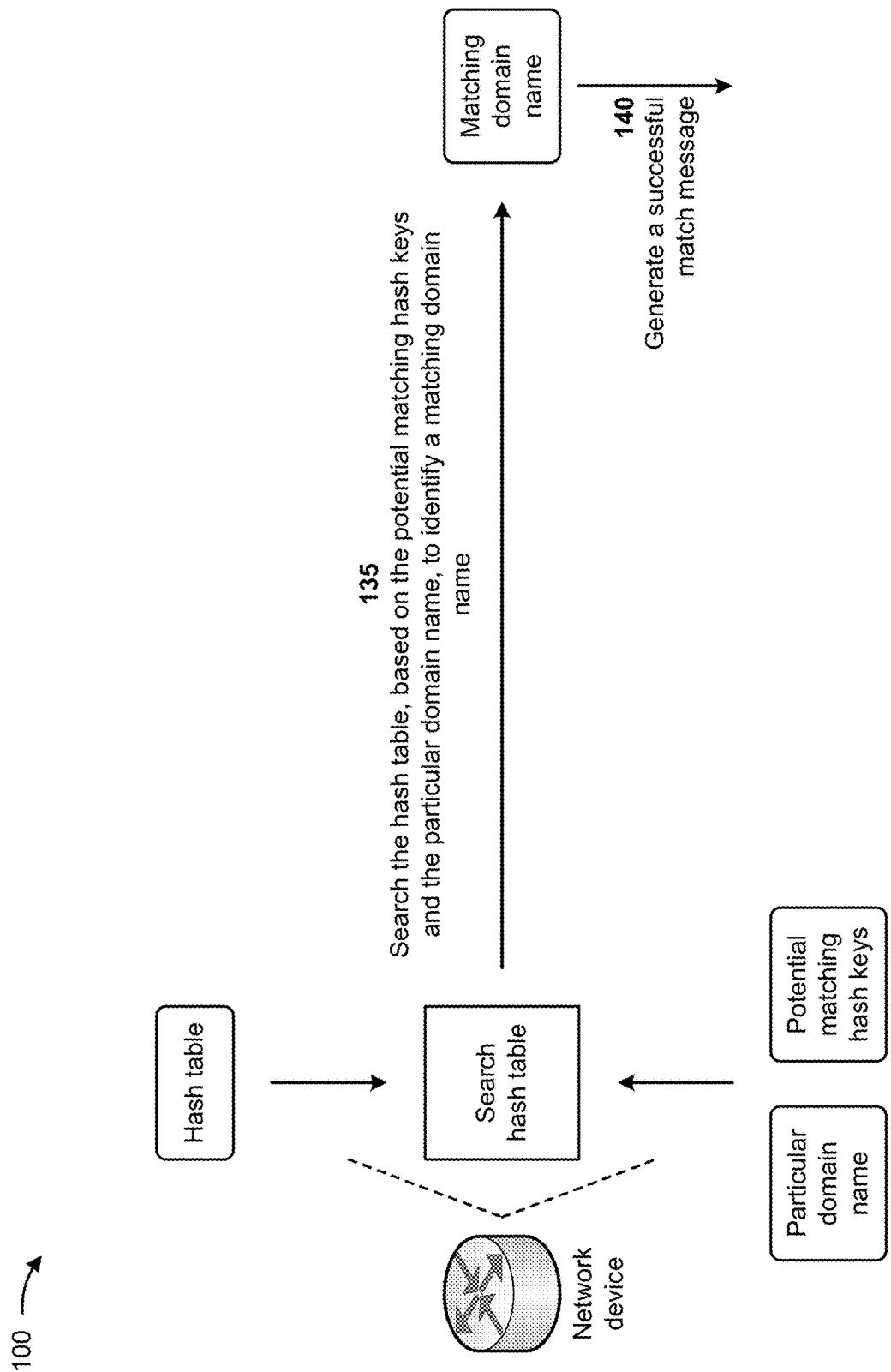

Turning to FIG. 1G, and reference number 135, the network device may search the hash table, based on the potential matching hash keys and the particular domain name, to identify a matching domain name (e.g., a domain name stored in the hash table that is the same as or is similar to the particular domain name). In some implementations, the network device may identify an index of the hash table that is associated with a potential matching hash key. For example, when the potential matching hash key is a 1-tuple (x), the network device may identify an x index of a one-dimensional hash table; when the potential matching hash key is a 2-tuple (x, y), the network device may identify an (x, y) index of a two-dimensional hash table; or when the potential matching hash key is a 3-tuple (x, y, z), the network device may identify an (x, y, z) index of a three-dimensional hash table; among other examples. The network device may identify an entry associated with the index and may determine whether a stored domain name included in the entry matches the particular domain name.

For example, the entry may include one or more stored domain names (e.g., stored as nodes in a linked list) and the network device may determine whether a particular stored domain name, of the one or more stored domain names, is the same as the particular domain name or is similar to the particular domain name (e.g., the particular stored domain name is the same as at least a first part of the particular domain name, and the particular stored domain name includes at least one wildcard that represents at least a second part of the particular domain name). When the network device determines that the particular stored domain name matches the particular domain name, the network device may identify the particular stored domain name as a matching domain name and perform one or more processing steps associated with reference number 140 shown in FIG. 1G.

Alternatively, when the network device determines that the particular stored domain name does not match the particular domain name, the network device may identify an index of the hash table that is associated with another potential matching hash key and may determine whether an additional stored domain name included in an entry associated with the index matches the particular domain name. The network device may iteratively perform one or more steps associated with reference number 135 in this way until the network device identifies a matching domain name or the network device fails to identify a matching domain name.

When the network device fails to find a matching domain name, the network device may generate an error message. The network device may send the error message to the client device (e.g., for display on a display of the client device) or may store the error message (e.g., for reporting associated with operation of the network device). The error message may indicate that the particular domain name was not found in the hash table and/or that the network device does not have access to the particular domain name (e.g., the error message is associated with a network security issue), among other examples.

As further shown in FIG. 1G, and by reference number 140, when the network device identifies a matching domain name (e.g., the particular stored domain name), the network device may generate a successful match message. The network device may send the successful match message to the client device (e.g., for display on the display of the client device) or may store the successful match message (e.g., for reporting associated with operation of the network device). In some implementations, the successful match message may indicate that the particular domain name was found in the hash table and/or that the network device has access to the particular domain name, among other examples. In some implementations, the successful match message may include an IP address of the matching domain name and/or one or more rules associated with accessing the IP address (e.g., that were stored in the hash table with the matching domain name). The client device may connect to another device (e.g., another server device) based on receiving the successful match message.

As indicated above, FIGS. 1A-1G are provided as an example. Other examples may differ from what is described with regard to FIGS. 1A-1G. The number and arrangement of devices shown in FIGS. 1A-1G are provided as an example. In practice, there may be additional devices, fewer devices, different devices, or differently arranged devices than those shown in FIGS. 1A-1G. Furthermore, two or more devices shown in FIGS. 1A-1G may be implemented within a single device, or a single device shown in FIGS. 1A-1G may be implemented as multiple, distributed devices. Additionally, or alternatively, a set of devices (e.g., one or more devices) shown in FIGS. 1A-1G may perform one or more functions described as being performed by another set of devices shown in FIGS. 1A-1G.

Figure 2:
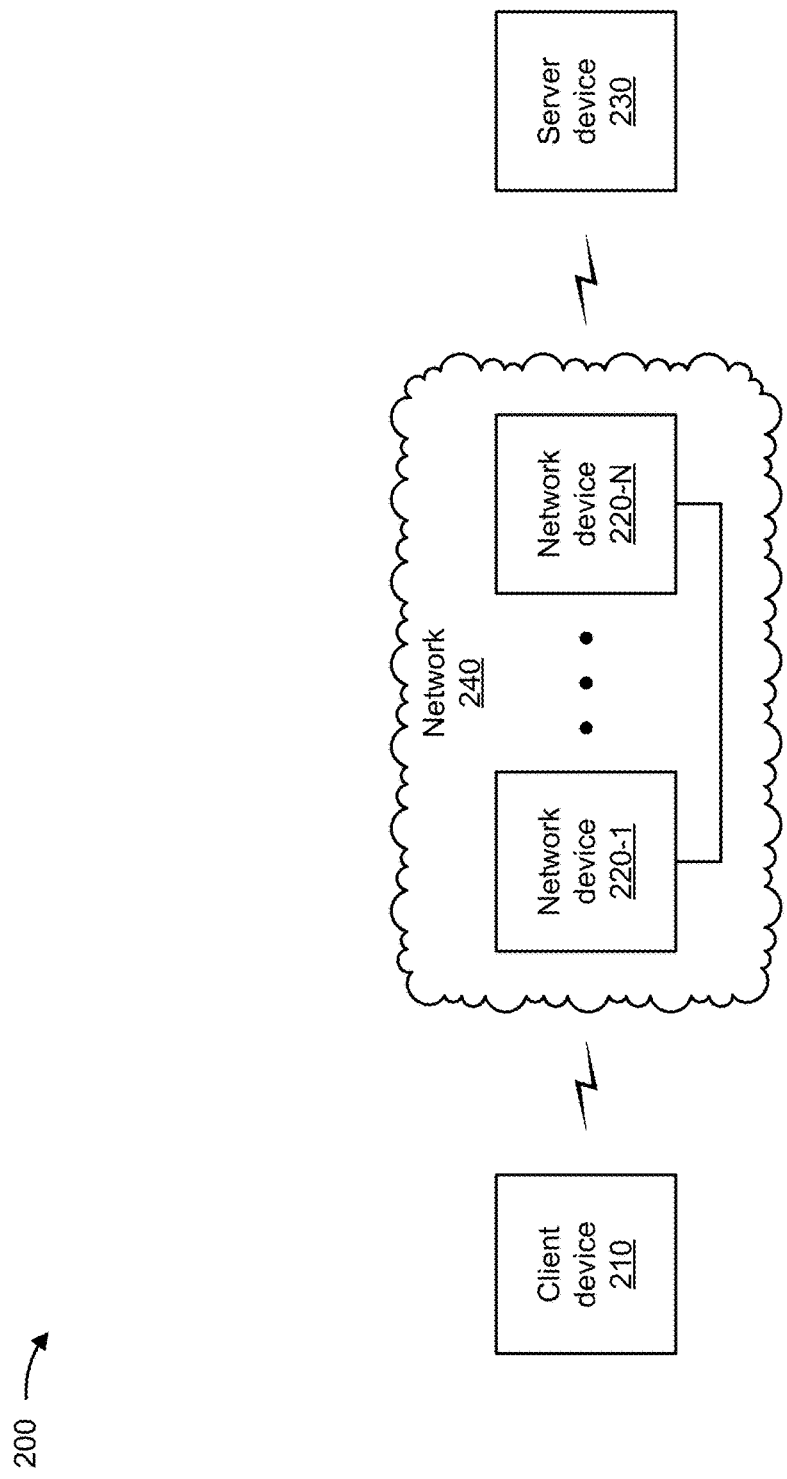

FIG. 2 is a diagram of an example environment 200 in which systems and/or methods described herein may be implemented. As shown in FIG. 2, environment 200 may include a client device 210, a group of network devices 220 (shown as network device 220-1 through network device 220-N), a server device 230, and a network 240. Devices of environment 200 may interconnect via wired connections, wireless connections, or a combination of wired and wireless connections.

Client device 210 includes one or more devices capable of receiving, generating, storing, processing, and/or providing information, such as information described herein. In some implementations, client device 210 may send a search request that includes a particular domain name to network device 220. For example, client device 210 may include a mobile phone (e.g., a smart phone, a radiotelephone, and/or the like), a laptop computer, a tablet computer, a desktop computer, a handheld computer, a gaming device, a wearable communication device (e.g., a smart watch, a pair of smart glasses, a heart rate monitor, a fitness tracker, smart clothing, smart jewelry, a head mounted display, and/or the like), a network device, or a similar type of device. In some implementations, client device 210 may receive network traffic from and/or may provide network traffic to other client devices 210 and/or server device 230, via network 240 (e.g., by routing packets using network devices 220 as intermediaries).

Network device 220 includes one or more devices capable of receiving, processing, storing, routing, and/or providing traffic (e.g., a packet, other information or metadata, and/or the like) in a manner described herein. In some implementations, network device 220 may perform one or more processing steps relating to pattern matching for domain names with wildcard characters. For example, network device 220 may include a router, such as a label switching router (LSR), a label edge router (LER), an ingress router, an egress router, a provider router (e.g., a provider edge router, a provider core router, and/or the like), a virtual router, and/or the like. Additionally, or alternatively, network device 220 may include a gateway, a switch, a firewall, a hub, a bridge, a reverse proxy, a server (e.g., a proxy server, a cloud server, a data center server, and/or the like), a load balancer, and/or a similar device. In some implementations, network device 220 may be a physical device implemented within a housing, such as a chassis. In some implementations, network device 220 may be a virtual device implemented by one or more computer devices of a cloud computing environment or a data center. In some implementations, a group of network devices 220 may be a group of data center nodes that are used to route traffic flow through network 240.

Server device 230 includes one or more devices capable of receiving, generating, storing, processing, and/or providing information, such as information described herein. In some implementations, server device 230 may provide a plurality of domain names to network device 220. For example, server device 230 may include a laptop computer, a tablet computer, a desktop computer, a group of server devices, or a similar type of device, associated with multicast traffic. In some implementations, server device 230 may receive information from and/or transmit information (e.g., multicast traffic) to client device 210, via network 240 (e.g., by routing packets using network devices 220 as intermediaries).

Network 240 includes one or more wired and/or wireless networks. For example, network 240 may include a packet switched network, a cellular network (e.g., a fifth generation (5G) network, a fourth generation (4G) network, such as a long-term evolution (LTE) network, a third generation (3G) network, a code division multiple access (CDMA) network, a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
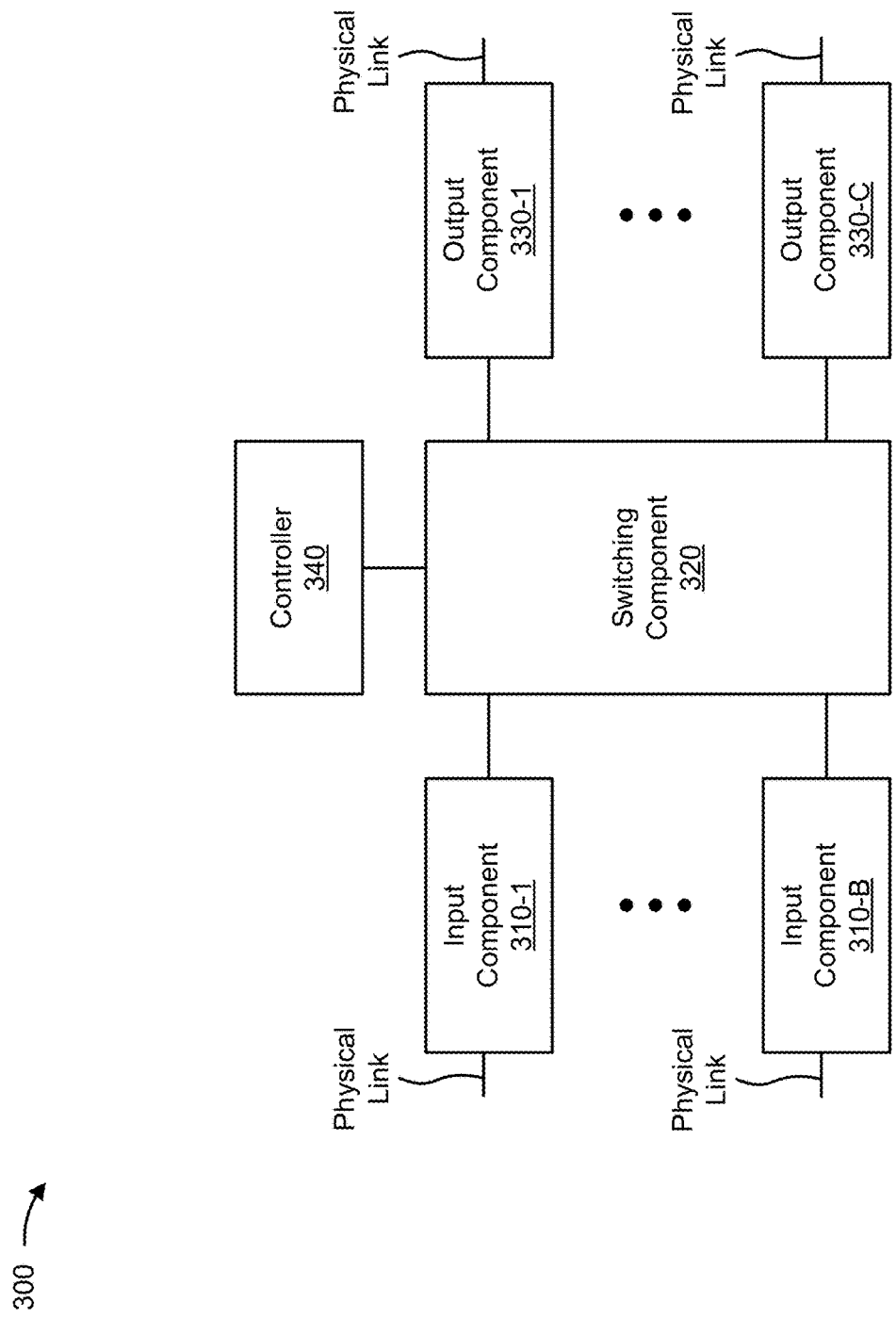

FIG. 3 is a diagram of example components of a device 300. Device 300 may correspond to client device 210, network device 220, server device 230, and/or the like. In some implementations, client device 210, network device 220, server device 230, and/or the like may include one or more devices 300 and/or one or more components of device 300. As shown in FIG. 3, device 300 may include one or more input components 310-1 through 310-B (B≥1) (hereinafter referred to collectively as input components 310, and individually as input component 310), a switching component 320, one or more output components 330-1 through 330-C (C≥1) (hereinafter referred to collectively as output components 330, and individually as output component 330), and a controller 340.

Input component 310 may be one or more points of attachment for physical links and may be one or more points of entry for incoming traffic, such as packets. Input component 310 may process incoming traffic, such as by performing data link layer encapsulation or decapsulation. In some implementations, input component 310 may transmit and/or receive packets. In some implementations, input component 310 may include an input line card that includes one or more packet processing components (e.g., in the form of integrated circuits), such as one or more interface cards (IFCs), packet forwarding components, line card controller components, input ports, processors, memories, and/or input queues. In some implementations, device 300 may include one or more input components 310.

Switching component 320 may interconnect input components 310 with output components 330. In some implementations, switching component 320 may be implemented via one or more crossbars, via buses, and/or with shared memories. The shared memories may act as temporary buffers to store packets from input components 310 before the packets are eventually scheduled for delivery to output components 330. In some implementations, switching component 320 may enable input components 310, output components 330, and/or controller 340 to communicate with one another.

Output component 330 may store packets and may schedule packets for transmission on output physical links. Output component 330 may support data link layer encapsulation or decapsulation, and/or a variety of higher-level protocols. In some implementations, output component 330 may transmit packets and/or receive packets. In some implementations, output component 330 may include an output line card that includes one or more packet processing components (e.g., in the form of integrated circuits), such as one or more IFCs, packet forwarding components, line card controller components, output ports, processors, memories, and/or output queues. In some implementations, device 300 may include one or more output components 330. In some implementations, input component 310 and output component 330 may be implemented by the same set of components (e.g., and input/output component may be a combination of input component 310 and output component 330).

Controller 340 includes a processor in the form of, for example, a CPU, a GPU, an APU, a microprocessor, a microcontroller, a DSP, an FPGA, an ASIC, and/or another type of processor. The processor is implemented in hardware, firmware, or a combination of hardware and software. In some implementations, controller 340 may include one or more processors that can be programmed to perform a function.

In some implementations, controller 340 may include a RAM, a ROM, and/or another type of dynamic or static storage device (e.g., a flash memory, a magnetic memory, an optical memory, etc.) that stores information and/or instructions for use by controller 340.

In some implementations, controller 340 may communicate with other devices, networks, and/or systems connected to device 300 to exchange information regarding network topology. Controller 340 may create routing tables based on the network topology information, may create forwarding tables based on the routing tables, and may forward the forwarding tables to input components 310 and/or output components 330. Input components 310 and/or output components 330 may use the forwarding tables to perform route lookups for incoming and/or outgoing packets.

Controller 340 may perform one or more processes described herein. Controller 340 may perform these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or storage component associated with controller 340 from another computer-readable medium or from another device via a communication interface. When executed, software instructions stored in a memory and/or storage component associated with controller 340 may cause controller 340 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
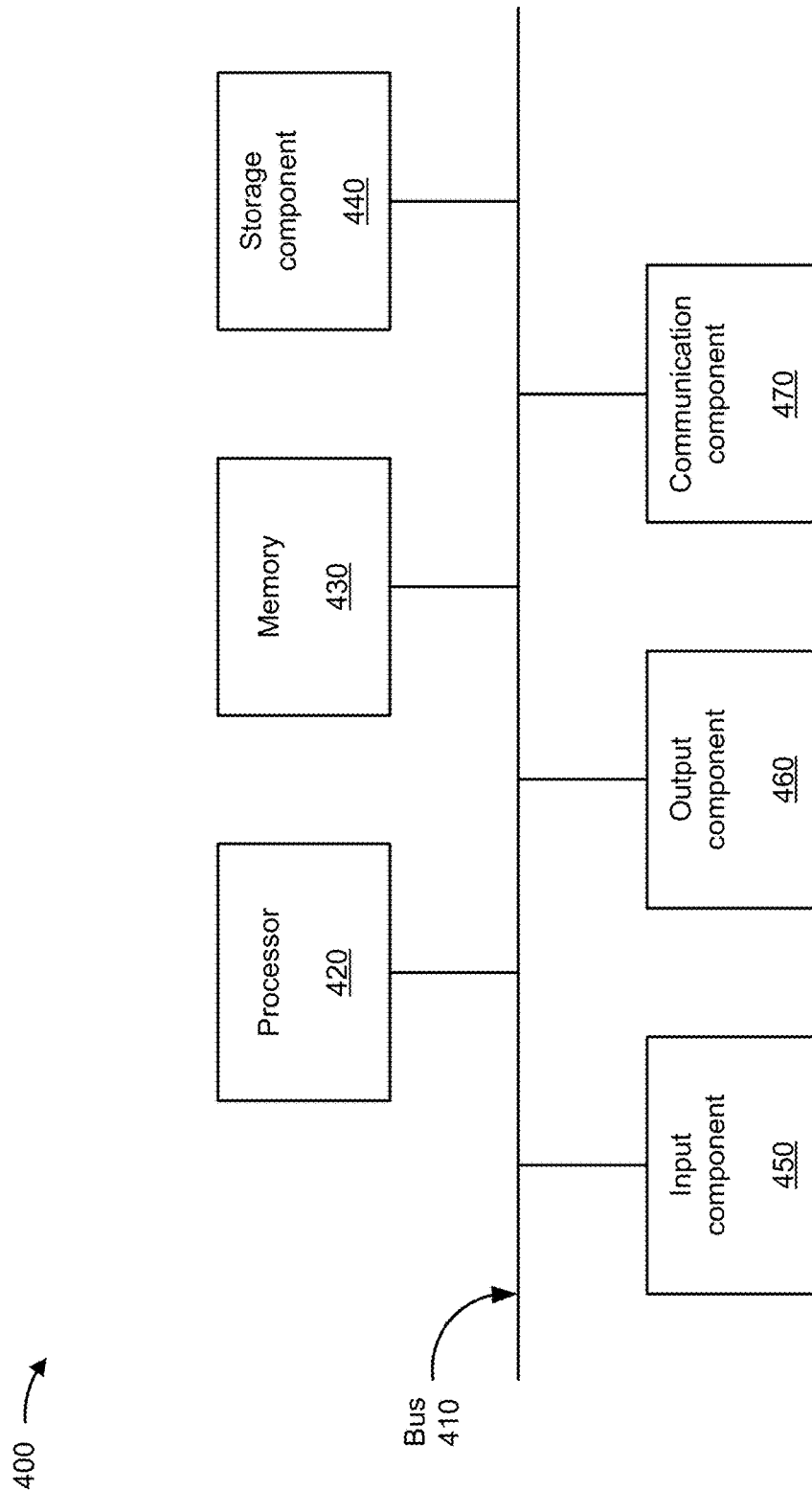

FIG. 4 is a diagram of example components of a device 400, which may correspond to client device 210, network device 220, server device 230, and/or the like. In some implementations, client device 210, network device 220, server device 230, and/or the like may include one or more devices 400 and/or one or more components of device 400. As shown in FIG. 4, device 400 may include a bus 410, a processor 420, a memory 430, a storage component 440, an input component 450, an output component 460, and a communication component 470.

Bus 410 includes a component that enables wired and/or wireless communication among the components of device 400. Processor 420 includes a central processing unit, a graphics processing unit, a microprocessor, a controller, a microcontroller, a digital signal processor, a field-programmable gate array, an application-specific integrated circuit, and/or another type of processing component. Processor 420 is implemented in hardware, firmware, or a combination of hardware and software. In some implementations, processor 420 includes one or more processors capable of being programmed to perform a function. Memory 430 includes a random access memory, a read only memory, and/or another type of memory (e.g., a flash memory, a magnetic memory, and/or an optical memory).

Storage component 440 stores information and/or software related to the operation of device 400. For example, storage component 440 may include a hard disk drive, a magnetic disk drive, an optical disk drive, a solid state disk drive, a compact disc, a digital versatile disc, and/or another type of non-transitory computer-readable medium. Input component 450 enables device 400 to receive input, such as user input and/or sensed inputs. For example, input component 450 may include a touch screen, a keyboard, a keypad, a mouse, a button, a microphone, a switch, a sensor, a global positioning system component, an accelerometer, a gyroscope, and/or an actuator. Output component 460 enables device 400 to provide output, such as via a display, a speaker, and/or one or more light-emitting diodes. Communication component 470 enables device 400 to communicate with other devices, such as via a wired connection and/or a wireless connection. For example, communication component 470 may include a receiver, a transmitter, a transceiver, a modem, a network interface card, and/or an antenna.

Device 400 may perform one or more processes described herein. For example, a non-transitory computer-readable medium (e.g., memory 430 and/or storage component 440) may store a set of instructions (e.g., one or more instructions, code, software code, and/or program code) for execution by processor 420. Processor 420 may execute the set of instructions to perform one or more processes described herein. In some implementations, execution of the set of instructions, by one or more processors 420, causes the one or more processors 420 and/or the device 400 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 4 are provided as an example. Device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

Figure 5:
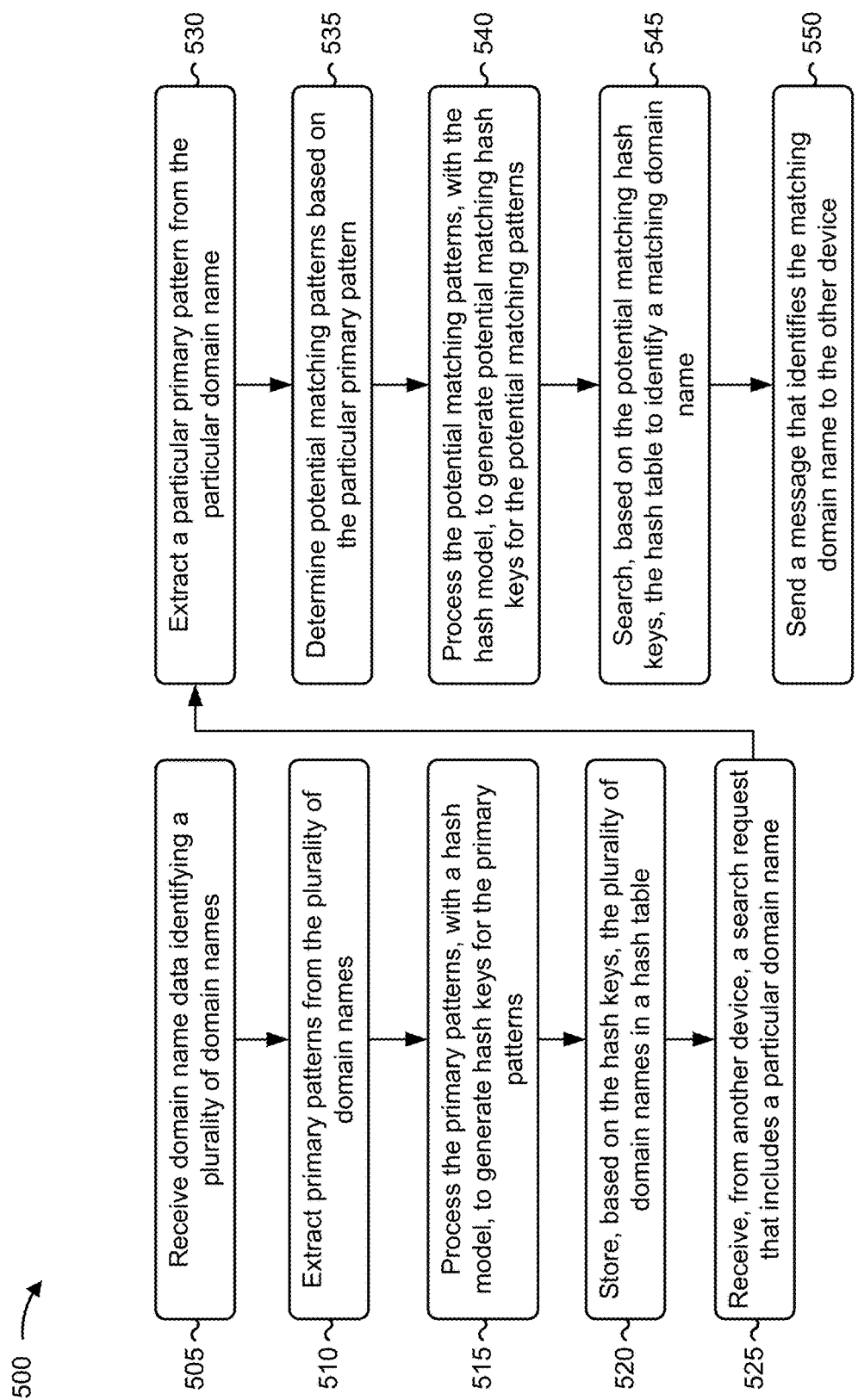

FIG. 5 is a flowchart of an example process 500 associated with pattern for domain names with wildcard characters. In some implementations, one or more process blocks of FIG. 5 may be performed by a network device (e.g., network device 220). In some implementations, one or more process blocks of FIG. 5 may be performed by another device or a group of devices separate from or including the network device, such as a client device (e.g., client device 210) and/or a server device (e.g., server device 230). Additionally, or alternatively, one or more process blocks of FIG. 5 may be performed by one or more components of device 300, such as input component 310, switching component 320, output component 330, and/or controller 340; one or more components of device 400, such as processor 420, memory 430, storage component 440, input component 450, output component 460, and/or communication component 470; and/or the like.

As shown in FIG. 5, process 500 may include receiving domain name data identifying a plurality of domain names (block 505). For example, the network device may receive domain name data identifying a plurality of domain names, as described above. In some implementations, one or more of the plurality of domain names include a wildcard character.

As further shown in FIG. 5, process 500 may include extracting primary patterns from the plurality of domain names (block 510). For example, the network device may extract primary patterns from the plurality of domain names, as described above. In some implementations, one or more of the primary patterns include a wildcard character.

As further shown in FIG. 5, process 500 may include processing the primary patterns, with a hash model, to generate hash keys for the primary patterns (block 515). For example, the network device may process the primary patterns, with a hash model, to generate hash keys for the primary patterns, as described above. In some implementations, one or more of the hash keys include a hash value associated with a wildcard character As further shown in FIG. 5, process 500 may include storing, based on the hash keys, the plurality of domain names in a hash table (block 520). For example, the network device may store, based on the hash keys, the plurality of domain names in a hash table, as described above.

As further shown in FIG. 5, process 500 may include receiving, from another device, a search request that includes a particular domain name (block 525). For example, the network device may receive, from another device, a search request that includes a particular domain name, as described above.

As further shown in FIG. 5, process 500 may include extracting a particular primary pattern from the particular domain name (block 530). For example, the network device may extract a particular primary pattern from the particular domain name, as described above.

As further shown in FIG. 5, process 500 may include determining potential matching patterns based on the particular primary pattern (block 535). For example, the network device may determine potential matching patterns based on the particular primary pattern, as described above. In some implementations, one or more of the potential matching patterns include a wildcard character.

As further shown in FIG. 5, process 500 may include processing the potential matching patterns, with the hash model, to generate potential matching hash keys for the potential matching patterns (block 540). For example, the network device may process the potential matching patterns, with the hash model, to generate potential matching hash keys for the potential matching patterns, as described above. In some implementations, one or more of the potential matching hash keys include a hash value associated with a wildcard character.

As further shown in FIG. 5, process 500 may include searching, based on the potential matching hash keys, the hash table to identify a matching domain name (block 545). For example, the network device may search, based on the potential matching hash keys, the hash table to identify a matching domain name, as described above.

As further shown in FIG. 5, process 500 may include sending a message that identifies the matching domain name to the other device (block 550). For example, the network device may send a message that identifies the matching domain name to the other device, as described above.

Process 500 may include additional implementations, such as any single implementation or any combination of implementations described below and/or in connection with one or more other processes described elsewhere herein.

In a first implementation, the one or more of the plurality of domain names include a first wildcard character that represents zero or more words in the one or more of the plurality of domain names, or a second wildcard character that represents one word in the one or more of the plurality of domain names.

In a second implementation, alone or in combination with the first implementation, processing the primary patterns, with the hash model, to generate the hash keys for the primary patterns comprises calculating first hash values based on first words located from a right direction in the primary patterns, calculating second hash values based on second words located from the right direction in the primary patterns, and combining the first hash values and the second hash values to generate the hash keys for the primary patterns.

In a third implementation, alone or in combination with one or more of the first and second implementations, the hash table includes a two-dimensional hash table or a three-dimensional hash table.

In a fourth implementation, alone or in combination with one or more of the first through third implementations, process 500 includes determining that two of the primary patterns are mapped to a particular hash key of the hash keys, and storing two of the plurality of domain names that are associated with the particular hash key in the hash table as nodes of a linked list.

In a fifth implementation, alone or in combination with one or more of the first through fourth implementations, searching the hash table to identify the matching domain name comprises identifying an entry of the hash table associated with one of the potential matching hash keys, determining that a stored domain name in the entry of the hash table matches the particular domain name, and identifying the stored domain name as the matching domain name.

In a sixth implementation, alone or in combination with one or more of the first through fifth implementations, extracting the primary patterns from the plurality of domain names comprises identifying second words located from a right direction in the plurality of domain names, identifying third words located from the right direction in the plurality of domain names, and combining the second words and the third words to generate the primary patterns from the plurality of domain names.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
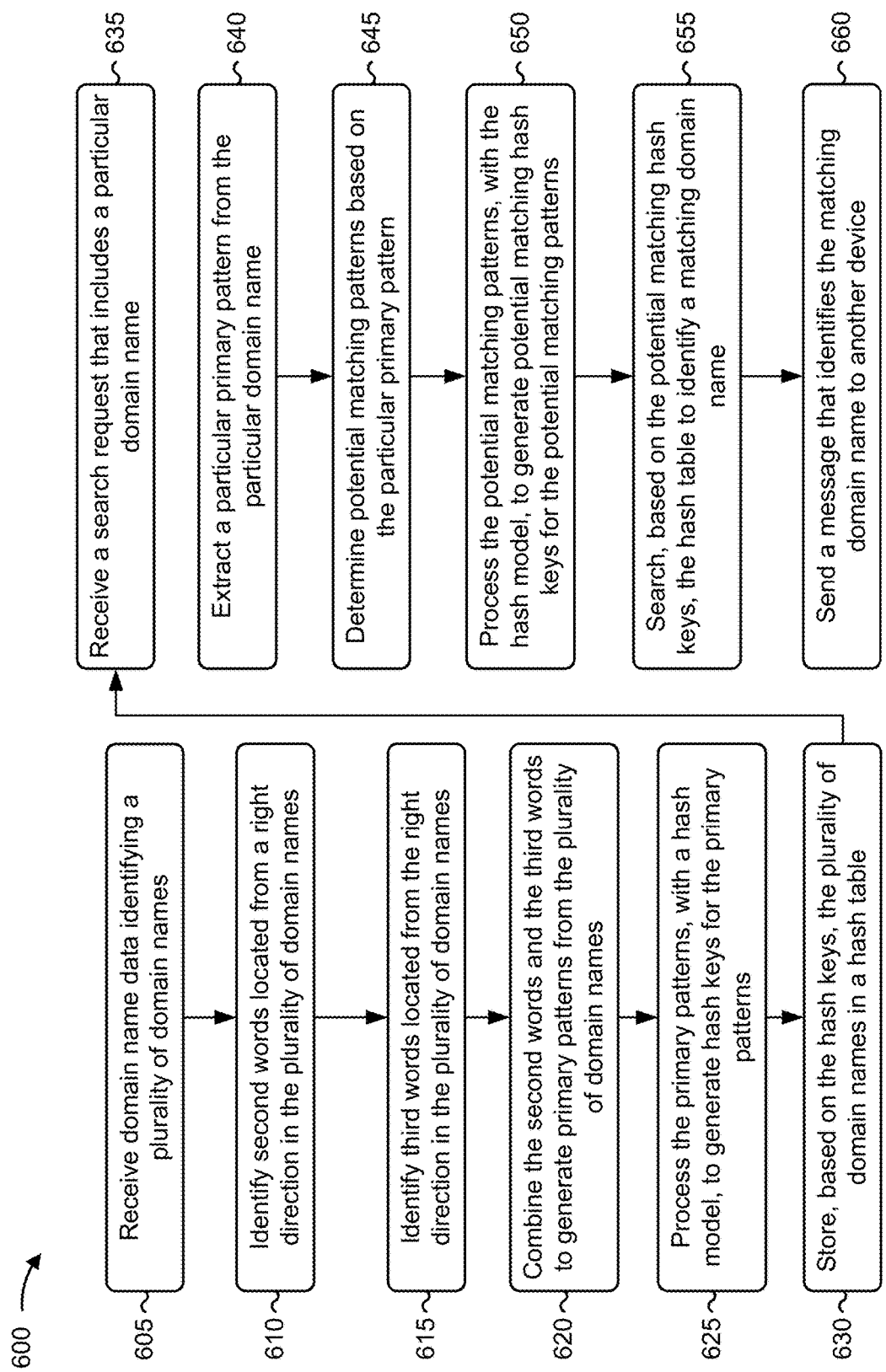

FIG. 6 is a flowchart of an example process 600 associated with pattern matching for domain names with wildcard characters. In some implementations, one or more process blocks of FIG. 6 may be performed by a network device (e.g., network device 220). In some implementations, one or more process blocks of FIG. 6 may be performed by another device or a group of devices separate from or including the network device, such as a client device (e.g., client device 210) and/or a server device (e.g., server device 230). Additionally, or alternatively, one or more process blocks of FIG. 6 may be performed by one or more components of device 300, such as input component 310, switching component 320, output component 330, and/or controller 340; one or more components of device 400, such as processor 420, memory 430, storage component 440, input component 450, output component 460, and/or communication component 470; and/or the like.

As shown in FIG. 6, process 600 may include receiving domain name data identifying a plurality of domain names (block 605). For example, the network device may receive domain name data identifying a plurality of domain names, as described above.

As further shown in FIG. 6, process 600 may include identifying second words located from a right direction in the plurality of domain names (block 610). For example, the network device may identify second words located from a right direction in the plurality of domain names, as described above.

As further shown in FIG. 6, process 600 may include identifying third words located from the right direction in the plurality of domain names (block 615). For example, the network device may identify third words located from the right direction in the plurality of domain names, as described above.

As further shown in FIG. 6, process 600 may include combining the second words and the third words to generate primary patterns from the plurality of domain names (block 620). For example, the network device may combine the second words and the third words to generate primary patterns from the plurality of domain names, as described above.

As further shown in FIG. 6, process 600 may include processing the primary patterns, with a hash model, to generate hash keys for the primary patterns (block 625). For example, the network device may process the primary patterns, with a hash model, to generate hash keys for the primary patterns, as described above. In some implementations, one or more of the hash keys include a hash value associated with a wildcard character.

As further shown in FIG. 6, process 600 may include storing, based on the hash keys, the plurality of domain names in a hash table (block 630). For example, the network device may store, based on the hash keys, the plurality of domain names in a hash table, as described above.

As further shown in FIG. 6, process 600 may include receiving a search request that includes a particular domain name (block 635). For example, the network device may receive a search request that includes a particular domain name, as described above.

As further shown in FIG. 6, process 600 may include extracting a particular primary pattern from the particular domain name (block 640). For example, the network device may extract a particular primary pattern from the particular domain name, as described above.

As further shown in FIG. 6, process 600 may include determining potential matching patterns based on the particular primary pattern (block 645). For example, the network device may determine potential matching patterns based on the particular primary pattern, as described above.

As further shown in FIG. 6, process 600 may include processing the potential matching patterns, with the hash model, to generate potential matching hash keys for the potential matching patterns (block 650). For example, the network device may process the potential matching patterns, with the hash model, to generate potential matching hash keys for the potential matching patterns, as described above. In some implementations, one or more of the potential matching hash keys include a hash value associated with a wildcard character.

As further shown in FIG. 6, process 600 may include searching, based on the potential matching hash keys, the hash table to identify a matching domain name (block 655). For example, the network device may search, based on the potential matching hash keys, the hash table to identify a matching domain name, as described above.

As further shown in FIG. 6, process 600 may include sending a message that identifies the matching domain name to another device (block 660). For example, the network device may send a message that identifies the matching domain name to another device, as described above.

Process 600 may include additional implementations, such as any single implementation or any combination of implementations described below and/or in connection with one or more other processes described elsewhere herein.

In a first implementation, the hash table is associated with a length value, a first wildcard character, that represents zero or more words in the one or more of the primary patterns, is associated with the length value minus three, and a second wildcard character, that represents one word in the one or more of the primary patterns, is associated with the length value minus two.

In a second implementation, alone or in combination with the first implementation, the hash table is associated with a length value, and words of the primary patterns are associated with hash values in a range from zero to four less than the length value.

In a third implementation, alone or in combination with one or more of the first and second implementations, process 600 includes receiving another search request that includes another domain name, extracting another primary pattern from the other domain name, determining additional potential matching patterns based on the other primary pattern, processing the additional potential matching patterns, with the hash model, to generate additional potential matching hash keys for the additional potential matching patterns, wherein one or more of the additional potential matching hash keys include a hash value associated with a wildcard character, searching, based on the additional potential matching hash keys, the hash table to fail to identify another matching domain name, and generating an error message based on failing to identify the other matching domain name.

In a fourth implementation, alone or in combination with one or more of the first through third implementations, the error message is associated with a network security issue.

In a fifth implementation, alone or in combination with one or more of the first through fourth implementations, a size of the hash table is scalable according to a quantity of the domain name data.

In a sixth implementation, alone or in combination with one or more of the first through fifth implementations, the message includes at least one of an IP address associated with the matching domain name, or one or more rules associated with accessing the IP address.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

Figure 7:
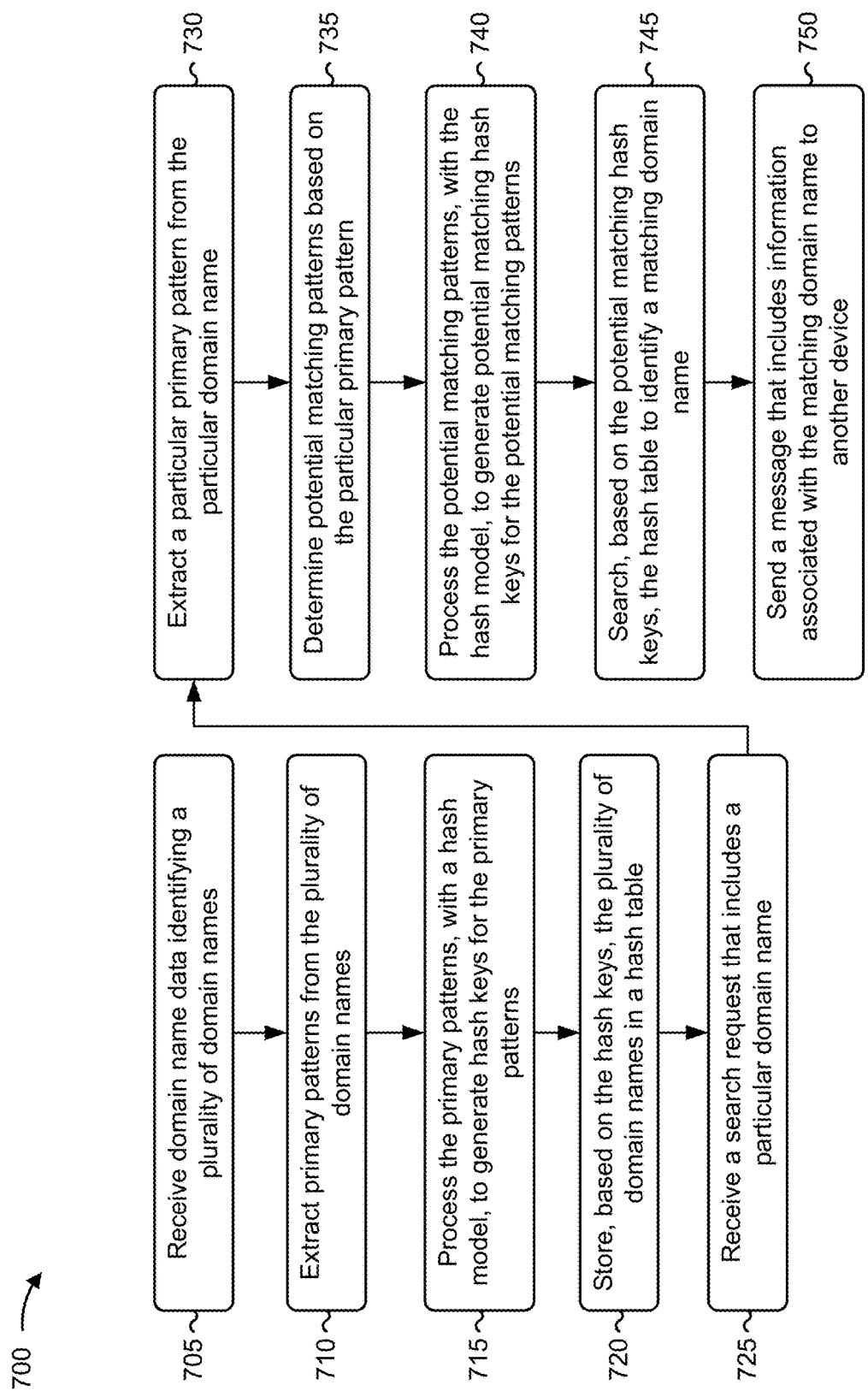

FIG. 7 is a flowchart of an example process 700 associated with pattern matching for domain names with wildcard characters. In some implementations, one or more process blocks of FIG. 7 may be performed by a network device (e.g., network device 220). In some implementations, one or more process blocks of FIG. 7 may be performed by another device or a group of devices separate from or including the network device, such as a client device (e.g., client device 210) and/or a server device (e.g., server device 230). Additionally, or alternatively, one or more process blocks of FIG. 7 may be performed by one or more components of device 300, such as input component 310, switching component 320, output component 330, and/or controller 340; one or more components of device 400, such as processor 420, memory 430, storage component 440, input component 450, output component 460, and/or communication component 470; and/or the like.

As shown in FIG. 7, process 700 may include receiving domain name data identifying a plurality of domain names (block 705). For example, the network device may receive domain name data identifying a plurality of domain names, as described above.

As further shown in FIG. 7, process 700 may include extracting primary patterns from the plurality of domain names (block 710). For example, the network device may extract primary patterns from the plurality of domain names, as described above.

As further shown in FIG. 7, process 700 may include processing the primary patterns, with a hash model, to generate hash keys for the primary patterns (block 715). For example, the network device may process the primary patterns, with a hash model, to generate hash keys for the primary patterns, as described above. In some implementations, one or more of the hash keys include a hash value associated with a wildcard character.

As further shown in FIG. 7, process 700 may include storing, based on the hash keys, the plurality of domain names in a hash table (block 720). For example, the network device may store, based on the hash keys, the plurality of domain names in a hash table, as described above.

As further shown in FIG. 7, process 700 may include receiving, from a client device, a search request that includes a particular domain name (block 725). For example, the network device may receive, from a client device, a search request that includes a particular domain name, as described above.

As further shown in FIG. 7, process 700 may include extracting a particular primary pattern from the particular domain name (block 730). For example, the network device may extract a particular primary pattern from the particular domain name, as described above.

As further shown in FIG. 7, process 700 may include determining potential matching patterns based on the particular primary pattern (block 735). For example, the network device may determine potential matching patterns based on the particular primary pattern, as described above.

As further shown in FIG. 7, process 700 may include processing the potential matching patterns, with the hash model, to generate potential matching hash keys for the potential matching patterns (block 740). For example, the network device may process the potential matching patterns, with the hash model, to generate potential matching hash keys for the potential matching patterns, as described above. In some implementations, one or more of the potential matching hash keys include a hash value associated with a wildcard character.

As further shown in FIG. 7, process 700 may include searching, based on the potential matching hash keys, the hash table to identify a matching domain name (block 745). For example, the network device may search, based on the potential matching hash keys, the hash table to identify a matching domain name, as described above.

As further shown in FIG. 7, process 700 may include sending a message that includes information associated with the matching domain name to another device (block 750). For example, the network device may send a message that includes information associated with the matching domain name to another device, as described above.

Process 700 may include additional implementations, such as any single implementation or any combination of implementations described below and/or in connection with one or more other processes described elsewhere herein.

In a first implementation, processing the primary patterns, with the hash model, to generate the hash keys for the primary patterns includes calculating first hash values based on first words located from a right direction in the primary patterns, calculating second hash values based on second words located from the right direction in the primary patterns, and combining the first hash values and the second hash values to generate the hash keys for the primary patterns.

In a second implementation, alone or in combination with the first implementation, process 700 includes determining that two of the primary patterns are mapped to a particular hash key of the hash keys, and storing two of the plurality of domain names that are associated with the particular hash key in the hash table as nodes of a linked list.

In a third implementation, alone or in combination with one or more of the first and second implementations, searching the hash table to identify the matching domain name includes identifying an entry of the hash table associated with one of the potential matching hash keys, determining that a stored domain name in the entry of the hash table matches the particular domain name, and identifying the stored domain name as the matching domain name.

In a fourth implementation, alone or in combination with one or more of the first through third implementations, extracting the primary patterns from the plurality of domain names includes identifying second words located from a right direction in the plurality of domain names, identifying third words located from the right direction in the plurality of domain names, and combining the second words and the third words to generate the primary patterns from the plurality of domain names.

In a fifth implementation, alone or in combination with one or more of the first through fourth implementations, a size of the hash table is scalable according to a quantity of the domain name data.

Although FIG. 7 shows example blocks of process 700, in some implementations, process 700 may include additional blocks, fewer blocks, different blocks, or differently arranged blocks than those depicted in FIG. 7. Additionally, or alternatively, two or more of the blocks of process 700 may be performed in parallel.

The foregoing disclosure provides illustration and description, but is not intended to be exhaustive or to limit the implementations to the precise forms disclosed. Modifications and variations may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
   receiving, by a network device, domain name data identifying a plurality of domain names,
      wherein one or more of the plurality of domain names include a wildcard character;
   extracting, by the network device, primary patterns from the plurality of domain names,
      wherein one or more of the primary patterns include a wildcard character;
   processing, by the network device, the primary patterns, with a hash model, to generate hash keys for the primary patterns,
      wherein one or more of the hash keys include a hash value associated with a wildcard character;
   storing, by the network device and based on the hash keys, the plurality of domain names in a hash table,
      wherein a size of the hash table is scalable according to a quantity of the domain name data;
   receiving, by the network device and from another device, a search request that includes a particular domain name;
   extracting, by the network device, a particular primary pattern from the particular domain name;
   determining, by the network device, potential matching patterns based on the particular primary pattern,
      wherein one or more of the potential matching patterns include a wildcard character;
   processing, by the network device, the potential matching patterns, with the hash model, to generate potential matching hash keys for the potential matching patterns,
      wherein one or more of the potential matching hash keys include a hash value associated with a wildcard character;
   searching, by the network device and based on the potential matching hash keys, the hash table to identify a matching domain name; and
   sending, by the network device, a message that identifies the matching domain name to the other device.

2. The method of claim 1, wherein the one or more of the plurality of domain names include:
   a first wildcard character that represents zero or more words in the one or more of the plurality of domain names, or
   a second wildcard character that represents one word in the one or more of the plurality of domain names.

3. The method of claim 1, wherein processing the primary patterns, with the hash model, to generate the hash keys for the primary patterns comprises:
   calculating first hash values based on first words located from a right direction in the primary patterns;
   calculating second hash values based on second words located from the right direction in the primary patterns; and
   combining the first hash values and the second hash values to generate the hash keys for the primary patterns.

4. The method of claim 1, wherein the hash table includes a two-dimensional hash table or a three-dimensional hash table.

5. The method of claim 1, further comprising:
   determining that two of the primary patterns are mapped to a particular hash key of the hash keys; and
   storing two of the plurality of domain names that are associated with the particular hash key in the hash table as nodes of a linked list.

6. The method of claim 1, wherein searching the hash table to identify the matching domain name comprises:
   identifying an entry of the hash table associated with one of the potential matching hash keys;
   determining that a stored domain name in the entry of the hash table matches the particular domain name; and
   identifying the stored domain name as the matching domain name.

7. The method of claim 1, wherein extracting the primary patterns from the plurality of domain names comprises:
   identifying second words located from a right direction in the plurality of domain names;
   identifying third words located from the right direction in the plurality of domain names; and
   combining the second words and the third words to generate the primary patterns from the plurality of domain names.

8. A network device, comprising:
   one or more memories; and
   one or more processors to:
      receive domain name data identifying a plurality of domain names;
      identify second words located from a right direction in the plurality of domain names;
      identify third words located from the right direction in the plurality of domain names;
      combine the second words and the third words to generate primary patterns from the plurality of domain names;
      process the primary patterns, with a hash model, to generate hash keys for the primary patterns,
         wherein one or more of the hash keys include a hash value associated with a wildcard character;
      store, based on the hash keys, the plurality of domain names in a hash table,
         wherein a size of the hash table is scalable according to a quantity of the domain name data;
      receive a search request that includes a particular domain name;
      extract a particular primary pattern from the particular domain name;
      determine potential matching patterns based on the particular primary pattern;
      process the potential matching patterns, with the hash model, to generate potential matching hash keys for the potential matching patterns,
         wherein one or more of the potential matching hash keys include a hash value associated with a wildcard character;
      search, based on the potential matching hash keys, the hash table to identify a matching domain name; and
      send a message that identifies the matching domain name to another device.

9. The network device of claim 8, wherein:
   the hash table is associated with a length value,
   a first wildcard character, that represents zero or more words in the one or more of the primary patterns, is associated with the length value minus three, and a second wildcard character, that represents one word in the one or more of the primary patterns, is associated with the length value minus two.

10. The network device of claim 8, wherein:
the hash table is associated with a length value, and
words of the primary patterns are associated with hash values in a range from zero to four less than the length value.

11. The network device of claim 8, wherein the one or more processors are further to:
receive another search request that includes another domain name;
extract another primary pattern from the other domain name;
determine additional potential matching patterns based on the other primary pattern;
process the additional potential matching patterns, with the hash model, to generate additional potential matching hash keys for the additional potential matching patterns,
wherein one or more of the additional potential matching hash keys include a hash value associated with a wildcard character;
search, based on the additional potential matching hash keys, the hash table to fail to identify another matching domain name; and
generate an error message based on failing to identify the other matching domain name.

12. The network device of claim 11, wherein the error message is associated with a network security issue.

13. The network device of claim 8, wherein the message includes at least one of:
an Internet protocol (IP) address associated with the matching domain name; or
one or more rules associated with accessing the IP address.

14. A non-transitory computer-readable medium storing a set of instructions, the set of instructions comprising:
one or more instructions that, when executed by one or more processors of a network device, cause the network device to:
receive domain name data identifying a plurality of domain names;
extract primary patterns from the plurality of domain names;
process the primary patterns, with a hash model, to generate hash keys for the primary patterns,
wherein one or more of the hash keys include a hash value associated with a wildcard character;
store, based on the hash keys, the plurality of domain names in a hash table,
wherein a size of the hash table is scalable according to a quantity of the domain name data;
receive, from a client device, a search request that includes a particular domain name;
extract a particular primary pattern from the particular domain name;
determine potential matching patterns based on the particular primary pattern;
process the potential matching patterns, with the hash model, to generate potential matching hash keys for the potential matching patterns,
wherein one or more of the potential matching hash keys include a hash value associated with a wildcard character;
search, based on the potential matching hash keys, the hash table to identify a matching domain name; and
send a message that includes information associated with the matching domain name to another device.

15. The non-transitory computer-readable medium of claim 14, wherein the one or more instructions, that cause the network device to process the primary patterns, with the hash model, to generate the hash keys for the primary patterns, cause the network device to:
calculate first hash values based on first words located from a right direction in the primary patterns;
calculate second hash values based on second words located from the right direction in the primary patterns; and
combine the first hash values and the second hash values to generate the hash keys for the primary patterns.

16. The non-transitory computer-readable medium of claim 14, wherein the one or more instructions further cause the network device to:
determine that two of the primary patterns are mapped to a particular hash key of the hash keys; and
store two of the plurality of domain names that are associated with the particular hash key in the hash table as nodes of a linked list.

17. The non-transitory computer-readable medium of claim 14, wherein the one or more instructions, that cause the network device to search the hash table to identify the matching domain name, cause the network device to:
identify an entry of the hash table associated with one of the potential matching hash keys;
determine that a stored domain name in the entry of the hash table matches the particular domain name; and
identify the stored domain name as the matching domain name.

18. The non-transitory computer-readable medium of claim 14, wherein the one or more instructions, that cause the network device to extract the primary patterns from the plurality of domain names, cause the network device to:
identify second words located from a right direction in the plurality of domain names;
identify third words located from the right direction in the plurality of domain names; and
combine the second words and the third words to generate the primary patterns from the plurality of domain names.

19. The network device of claim 8, wherein the quantity of domain name data corresponds to a quantity of the plurality of domain names.

20. The non-transitory computer-readable medium of claim 14, wherein the quantity of domain name data corresponds to a quantity of the plurality of domain names.

* * * * *